(No Model.)
2 Sheets—Sheet 1.
C. E. KETCHAM.
FISH TRAP.
No. 441,070. Patented Nov. 18, 1890.
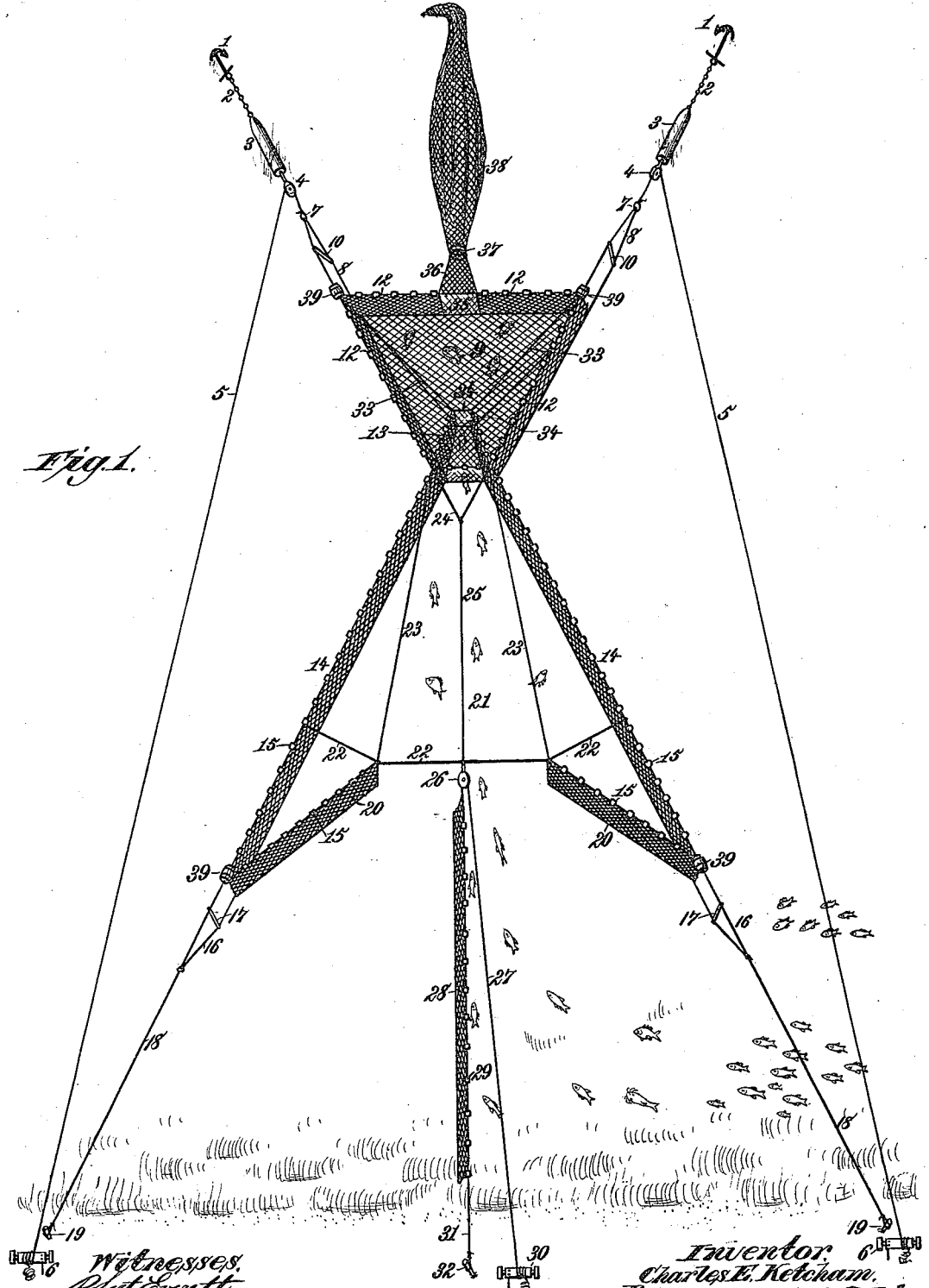

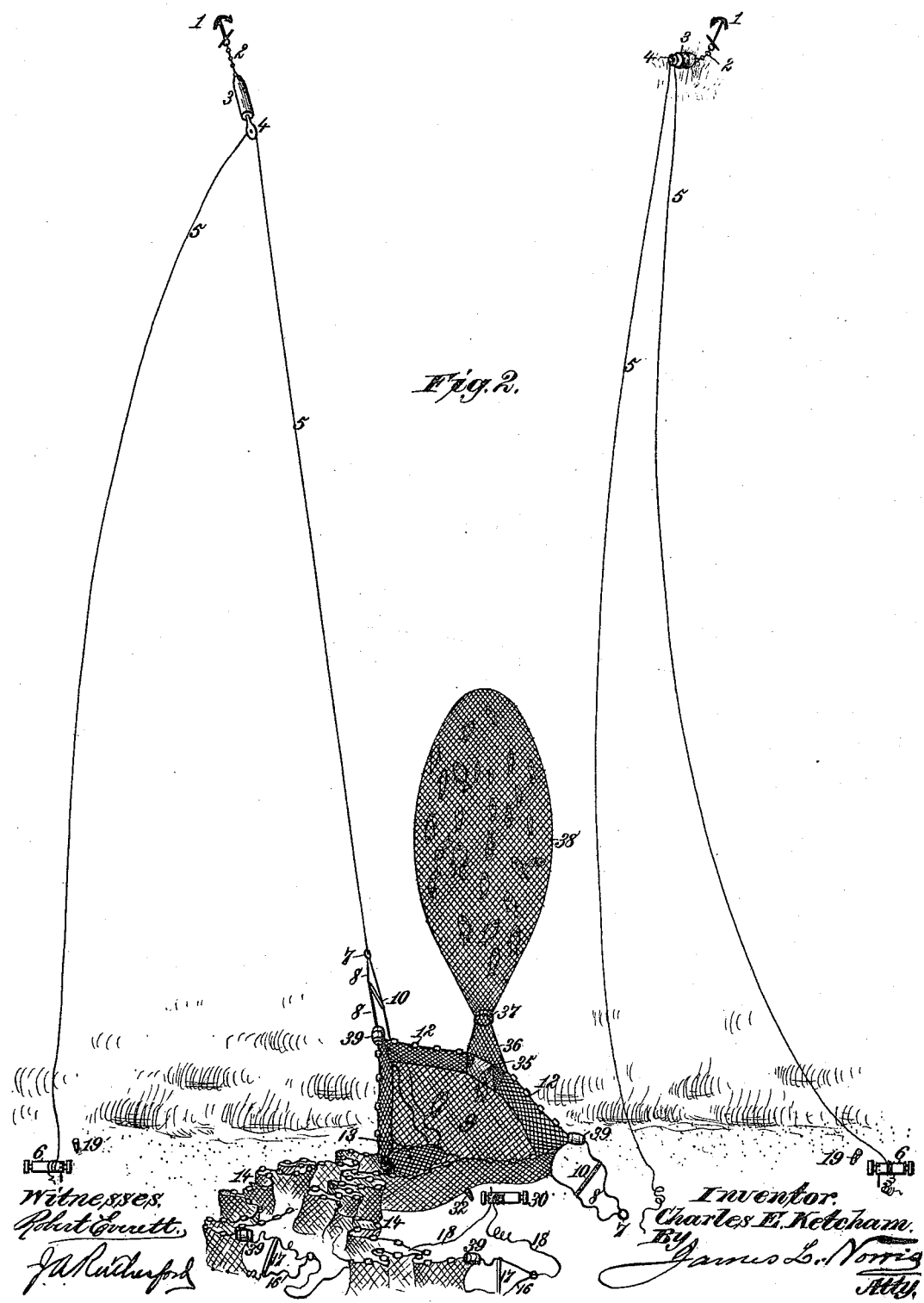

UNITED STATES PATENT OFFICE.

CHARLES E. KETCHAM, OF MANTEO, NORTH CAROLINA, ASSIGNOR OF ONE HALF TO ISAAC A. KETCHAM, OF BROOKLYN, NEW YORK.

FISH-TRAP.

SPECIFICATION forming part of Letters Patent No. 441,070, dated November 18, 1890.

Application filed July 5, 1890. Serial No. 357,833. (No model.)

*To all whom it may concern:*

Be it known that I, CHARLES E. KETCHAM, a citizen of the United States, residing at Manteo, in the county of Dare and State of North Carolina, have invented new and useful Improvements in Fish-Traps, of which the following is a specification.

My invention relates to a traveling fish trap, net, or seine especially adapted for ocean or deep-water fishing and capable of being operated wholly from the shore whenever occasion requires—such, for instance, as in stormy weather or where there are breakers or under other circumstances that render the use of boats dangerous or inconvenient or when the employment of boats to tend the nets would consume too much time.

The invention is applicable to fish-traps, pound-nets, fykes, and weirs of various forms and construction, and the several parts are portable and detachable and so arranged for joint operation that the net can be cast and landed without the use of boats by means of operating devices located on the shore, and by which in the event of a sudden storm the net or trap can be quickly landed with no loss of fish and without danger or inconvenience to the fishing-crew, as often occurs from the use of boats in bad weather. In good weather, however, the net or trap when set can be left in position and the trapped fish be removed by boats, if desired.

The invention is illustrated in the annexed drawings, in which—

Figure 1 is a top view of my improved traveling fish trap or net in position as cast, showing the manner is which the fish are trapped. Fig. 2 is a view of the same as landed.

Referring to the drawings, the numeral 1 designates anchors which are located at suitable distance off shore, according to the position in which the net or trap is to be located and beyond the point to be occupied by the pound-head. To each of these anchors is attached a chain 2, that connects with a float or buoy 3 of any suitable form. Each float or buoy 3 supports a sheave or pulley 4, through which is rove a trap-carrier cable 5, that extends inshore, where one end of said cable is attached to a windlass or capstan 6 of any suitable construction. The other end of each trap-carrier cable 5 is detachably connected to a ring or other similar connection 7, carried by a bridle 8, that connects with the pound-head 9, as shown in Fig. 1. One of these bridles 8 is attached to each outer offshore corner of the pound-head 9, and each bridle consists of a double line attached to the pound-head at top and bottom, the said lines in each bridle being held apart by a stay or stretcher 10, that assists in maintaining the sides of the pound-head in vertical position.

The pound-head 9 is preferably very nearly in the form of a triangle having its base offshore and its sides converging toward the shore, but not meeting each other. This pound-head is made of suitable netting and has a closed bottom, while its top is preferably open. The sides of the pound-head are provided with floats 12, located along their upper edges. In the inshore end of the pound-head 9 is a throat or funnel 13, that leads into the pound-head, as shown.

Attached to the inshore end of each side of the pound-head 9 is a wing 14, composed of a strip of netting leaded on its lower edge and having floats 15 attached to its upper edge. The wings 14 are extended inshore in diverging lines, and attached to each is a bridle 16, having a stretcher or stay 17, and provided with a cable or guy-rope 18, that is carried ashore and belayed to a pin or stake 19, or attached, if preferred, to the windlass or capstan. The inshore ends of the wings 14 are provided with returns 20, that converge toward the pound-head, and these returns are leaded and floated in the same manner as the main portions of the wings, and together therewith form what I term the "heart" 21 of the pound, or rather a heart-shaped outer entrance thereto, the inner entrance being formed by the funnel or throat 13, before described. The return wings 20 are connected with each other and with the main wings 14 by a stay-rope 22, that extends across the outer entrance to the trap. The inner end of each return wing 20 is also connected by a stay 23 to the inshore end of the pound-head 9 at one side of the entrance thereto. The heart-shaped wings are preferably detachable from the pound-head, with which they may be connected by any suitable or well-known means.

Attached to the entrance of the pound-head 9, at the outer end of the funnel 13, is a bridle 24, which connects with a central stay-rope 25, the other end of which is attached to the center of the transverse stay 22 and may support a pulley or sheave 26, as shown in Fig. 1. This sheave or pulley 26 receives a cable 27 for operating a guide-net or leader 28, that extends inshore midway between or from either side of said heart-shaped wings, the position of the pulley 26 being shifted accordingly. The upper edge of the guide-net 28 is provided with floats 29 and its lower edge is leaded, as usual. The cable 27 is attached to a windlass or capstan 30, by which the said cable is operated to cast the guide-net or leader 28 outward, and the inshore end of the said net 28 is connected by a line 31 to a pin or stake 32 or to the windlass 30, if preferred.

The funnel or throat 13 in the pound-head 9 is connected by guys or stay-ropes 33 with the outer corners of the pound-head, and top and bottom transverse stays 34 are also provided at the inner and outer ends of said funnel, whereby it is held distended and affords a ready entrance to the pound when the net or trap is cast and drawn taut, as hereinafter described. The funnel 13 is closed top and bottom and on both sides, but is open at both ends, of which the inner end is sufficiently contracted to prevent the return of fish that pass through said funnel into the pound-head, while the outer end of the funnel is held open by means of floats on its upper edge and leads on its lower edge to permit the free entrance of fish.

In the offshore end of the trap or pound 9 is a distended opening 35, that communicates with a funnel-net 36 on the outside of the pound-head, and this outer funnel-net 36 has a detachable connection 37 with a cod or bag net 38 for landing the fish.

The net or seine is cast by operating the capstan 6, so as to draw on the trap-carrier cables 5, and so float the apparatus to the desired position offshore. The lines or cables 18 are then drawn upon to spread and distend the pound-head and connected heart-shaped wings, the said lines 18 being afterward secured to the stakes 19 or to the capstan, and finally the guide-net or leader 28 is cast by means of the cable 27 and windlass 30, and made fast by the line 31 and stake 32, or otherwise. It will be seen that while in this position the several parts of the trap, net, or seine are distended so as to remain steady or swing altogether with the tide or currents and afford free access for fish that approach from either side of the guide-net 28, along which they will pass outward into and through the outer heart-shaped entrance 21, and thence through the inner entrance or funnel 13 into the interior of the pound-head 9, from which they can readily be removed by boats in fair weather, if desired. In seeking to escape from the pound-head 9 the fish will pass through the outer funnel 36 into the cod 38, or they may be driven therein and the cod detached and landed by a boat, another cod meanwhile being attached to the funnel 36 without disturbing the trap or pound, which can be left in position indefinitely, if desired. In the event of sudden bad weather, however, or should it be desired at any time to land the seine, net, or trap, it is only necessary to first cast off the cable 27 from the windlass 30 and draw in the guide-net or leader 28, and then cast off the trap-carrier cables 5 from the capstans 6 and land the trap, net, and its contents by means of the cables 18, which can be attached to the capstans. In the act of landing the seine the pound-head 9, collapsing, forces the imprisoned fish to pass through the outer funnel 36 into the cod 38, by which they are landed, as shown in Fig. 2, and the several parts of the apparatus can then be readily detached, if desired.

Instead of anchors 1 and buoys 3, I may employ a number of piles or stakes to support the offshore pulleys 4 but in deep-water fishing, and especially where the bottom is hard or rocky, two or more anchors and buoys are preferable, and, besides, they add materially to the convenience and efficiency of a portable and detachable traveling fish-trap, such as contemplated by my invention. When the buoys 3 are employed, being capable of floating upright, they can be easily found in case either trap-carrier cable 5 should become accidentally detached from the corresponding bridle 8, and by means of a boat the cable can be readily carried to and rove through the pulley and again connected with the trap.

In addition to the floats 12 and 15, the apparatus may be provided at suitable points with buoys or larger floats 39, if desired; but these will be seldom necessary.

By means of a portable and detachable traveling fish-trap of this character the use of boats can be practically avoided, the net or trap can be cast and landed with great ease and rapidity without risk to the attendants, and on the occurrence of sudden or severe storms the net can be quickly and safely landed and secured from injury.

It will be seen that by my invention the fishing apparatus or traveling trap-net is arranged to be moved back and forth, as required, between the shore and the offshore anchored pulleys, and that it can be safely and efficiently operated wholly from the shore and at substantially a right angle thereto with little or no regard to tides or currents.

What I claim as my invention is—

1. The combination, with a floating and traveling fish trap or net, of pulleys supported offshore on opposite sides of and beyond the position to be occupied by said trap or net, the trap-carrier cables engaged with said pulleys and connected with the offshore end of the floating trap, capstans or windlasses located on shore for attachment of said cables to operate the same in casting the net or trap, and lines or cables connected with the opposite sides of the inshore end of the trap or net and arranged to be secured on shore or attached to the windlasses to stay the trap when in position and to land the same when the trap-carrier cables are cast off, whereby the trap or net can be made to traverse the space between the shore and the offshore pulleys, substantially as described.

2. The combination, with a portable floating fish net or trap and means for casting and landing the same from the shore, of the floating heart-shaped wings and the guide-net or leader, said wings and leader being detachably connected with the trap-net and movable therewith to and from the shore, substantially as described.

3. The combination, with a portable and detachable floating fish trap or net and detachable wings forming a heart-shaped entrance to said trap or net, of a detachable guide-net or leader, cables for casting and landing the trap or net from the shore, and cables for casting and landing the guide-net, substantially as described.

4. The combination, with a portable and detachable floating fish trap or net, diverging wings forming an outer heart-shaped entrance to said trap, and a funnel-shaped inner net or throat, of stays for said wings and funnel, anchored pulleys located offshore beyond the opposite sides of the trap or net, and cables for casting and landing the trap or net from the shore, substantially as described.

5. The combination, with a traveling fish trap or net having an entrance in one side or end and provided with cables for casting and landing said trap or net from the shore, of a detachable cod or bag net communicating with the side or end of the trap opposite its entrance, substantially as described.

6. The combination, with a portable or traveling fish trap or net comprising a pound-head, heart-shaped entrance, wings, and a detachable cod or bag net communicating with the pound-head, of pulleys anchored offshore beyond said trap or net, cables for casting and landing said trap or net from the shore, and a guide-net or leader also operated from the shore, substantially as described.

In testimony whereof I have affixed my signature in presence of two witnesses.

CHARLES E. KETCHAM.

Witnesses:
JAMES L. NORRIS,
JAMES A. RUTHERFORD.